Sept. 26, 1967 H. A. GEORGE 3,344,329
ZERO SPEED INDICATOR FOR SHAFT ROTATION
Filed March 21, 1966
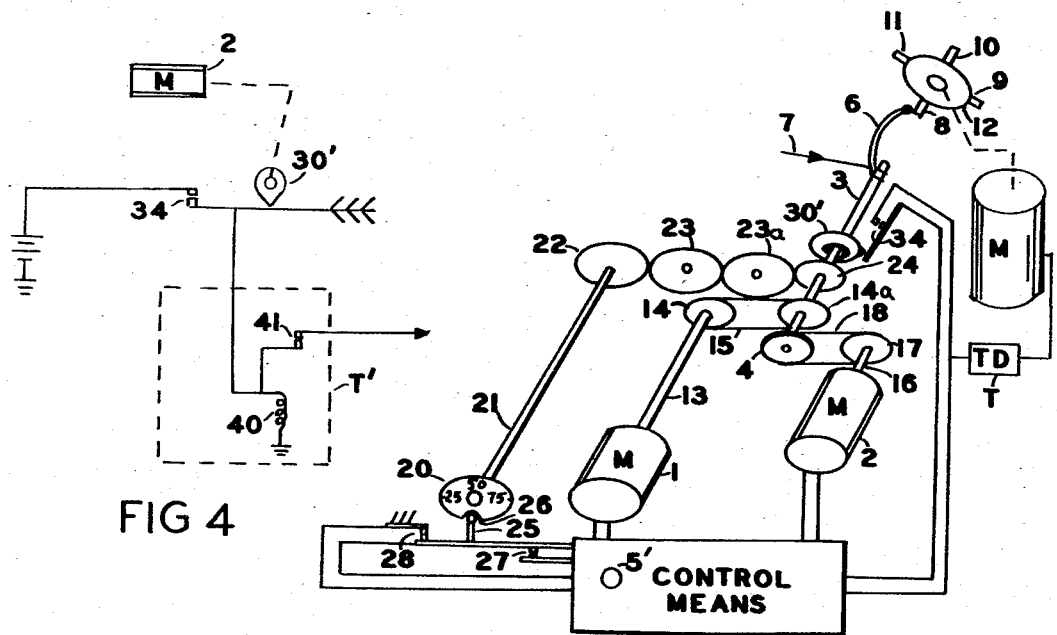
FIG 4
FIG 1
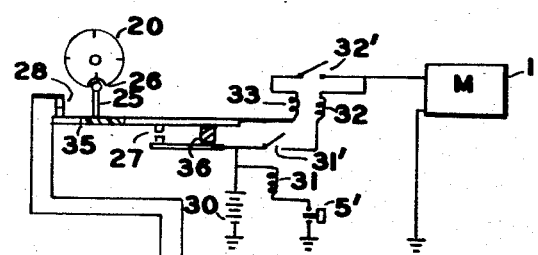
FIG 2
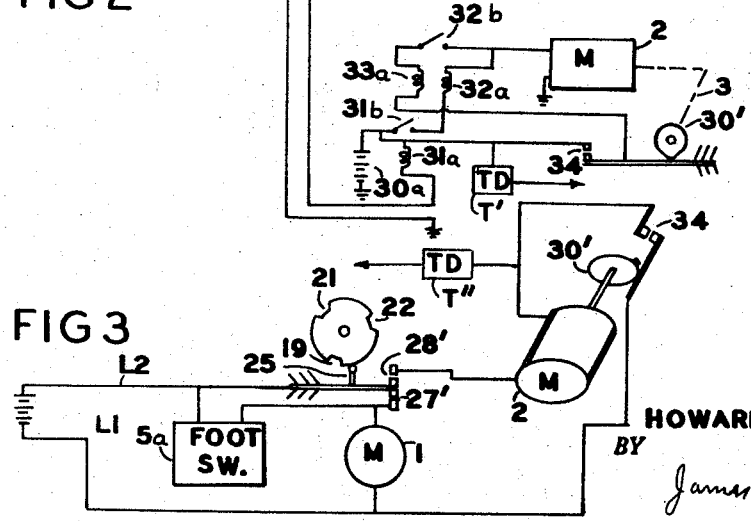
FIG 3
INVENTOR.
HOWARD A. GEORGE
BY
James P. Malone United States Patent Office 3,344,329
Patented Sept. 26, 1967

3,344,329
ZERO SPEED INDICATOR FOR SHAFT ROTATION
Howard A. George, Connecticut View Drive, Mill Neck, N.Y. 11765
Original application Dec. 31, 1962, Ser. No. 248,714. Divided and this application Mar. 21, 1966, Ser. No. 536,103
2 Claims. (Cl. 318—265)

This application is a division of my prior application, Serial No. 248,714, filed Dec. 31, 1962, now abandoned.

This invention relates to indexing means for a rotatable shaft drive and more particularly to such apparatus having means to stop the shaft at a predetermined angle of rotation. The device signals true zero speed.

A typical application of the present device is in the winding of electrical coils, on a mass production basis. In such apparatus the coil winding machine is set up to turn a predetermined number of revolutions in order to place a predetermined number of turns on the coil. It is desirable to start the winding at a predetermined angle relationship to the coil form and this feature is especially important in an apparatus where the coil forms are mounted on a rotatable turret, since the wire guide must be accurately positioned to permit the turret to index without interference.

The present invention generally comprises a first motor connected to rotate a shaft means to de-energize the first motor after a predetermined number of turns, and a second motor connected to them to turn the shaft to a predetermined angular position and then stop. The first motor is preferably a high speed motor and the positioning motor is a low speed motor.

Electrical control means are provided so that all that is required is to start the apparatus with a push button for each coil. The apparatus may be automatically recycling, if desired. Time delay means are provided to delay a signal to utilization apparatus until the motor is completely stopped at the proper position.

Accordingly, a principal object of the invention is to provide zero speed signal means.

Another object of the invention is to provide new and improved coil winding means.

Another object of the invention is to provide new and improved means for controlling the angle of rotation of a driven shaft when stopping.

These and other objects of the invention will be apparent from the following specification and drawings of which:

FIGURE 1 is a schematic diagram of the embodiment of the invention.

FIGURE 2 is a schematic circuit diagram for the embodiment of FIGURE 1.

FIGURE 3 is a simplified schematic circuit diagram for the embodiment of FIGURE 1.

FIGURE 4 is a detail circuit diagram of the time delay means.

The device is illustrated in connection with automatic coil winding equipment using a turret-type transfer device. This equipment carries a coil form or bobbin to the winding head by use of a group of holding fixtures (normally 8) mounted on a turntable, the indexing of which is effected by a Geneva mechanism. When a given coil form is in the winding area, the wire is wound on it by a "flyer" 6 which both revolves about the coil form 8 and oscillates in a predetermined pattern to provide the proper distribution of the wire. Provision is made for either counting the turns or measuring the wire so that the machine is brought to a stop using a dynamic braking variable speed motor so as to provide the basic adjustments required to produce satisfactory winding conditions.

Normally such devices, which may wind at speeds as high as 10,000 r.p.m., cannot stop precisely. In the past, means have been employed to slow the motor progressively as the end of the winding cycle approaches so as to get exact control of the turns count and in some cases to even control the positioning of the spindle when it finally comes to a stop. These approaches have a serious limitation when any considerable period of deceleration substantially increases the amount of time required to produce the coil.

Furthermore, they assume that exact spindle positioning is merely a refinement of exact turns control. In practice, these two requirements are unrelated. Exact spindle positioning may be a requirement on conventional winding in order to turn up the proper lug to which leads are attached, or otherwise the leads; on the turret-type machines described above positioning must be accomplished before the turret is indexed or the flyer will be broken because of interference with the coil which is moving out of the winding area. These requirements exist in each case even though there is a very generous tolerance on the number of turns required. On conventional machines the necessary positioning is done by hand although we suspect there will presently be a substantial move toward automatic positioning since it would save approximately one second per coil. On the automatic machines such as turret-type winders, however, positioning must be prompt, exact, and an interlock must be provided so that the turret cannot index until the spindle comes to rest in an acceptable position.

We have been rather successful in accomplishing this by the use of two motors, an over-riding clutch, and a set of contact points similar to those used in an automobile distributor. These points are actuated by a cam mounted on the machine spindle which opens the points only when the spindle is in an acceptable position. A high speed motor drives the spindle at the winding speed which may be as high as 12,000 r.p.m. A gearhead motor simultaneously drives a pulley mounted on an overrunning clutch at a few hundred r.p.m. When the desired count has been reached, the main motor is braked and the spindle speed falls rapidly until the overriding clutch takes control. This slow speed drive causes the spindle to make a portion of a revolution until the contacts are opened, whereupon it in turn brakes and the spindle comes to rest in the desired position. Such an arrangement provides positive positioning plus a clear electrical signal when positioning has been achieved. At first this seems to meet all of our requirements. In practice, on the other hand, occasionally the system malfunctions and it is this malfunction that the time delay relay prevents.

Consider the case in which the main motor has been braked but the spindle has not been fully decelerated and during this period, which is only a few microseconds in duration, the contact points are opened by the cam. At this moment, the circuitry is such as to supply the information that the spindle is in fact in position, but it does not necessarily mean that it has come to rest; in fact under these conditions the spindle may make one additional turn due to the inability of the components to bring it to a stop during the short period of time when the contacts are open. Once the contacts have closed again the spindle will continue on around and attempt to stop the next time when the flyer is in position. In the meantime, however, the other components in the circuit have received the signal indicating that the spindle was in position even if only momentarily. As a result the turret may start to index. A small amount of overlap in these two motions is permissible but if it should ever become excessive, interference can exist and damage to the machine can result. If this should occur only once in 100,000 cycles, it would still be unacceptable. We attempted to use so-called clutch type "zero speed switches" which are purported to indicate that the shaft has actually come to a stop but we found they did not live up to their name. They could be adjusted to give a signal when the shaft speed had fallen to perhaps 15 r.p.m. but not 0 r.p.m. It was this problem that the delay relay solved.

A signal appears on the cam contacts when the spindle is in position if only momentarily. This is applied to a time delay relay. Provision in the circuitry is preferably made so that this relay is not energized except with the main motor off so as to avoid undue wear on the relay. If this signal is of a certain minimum duration, we know that the spindle is actualy stopped. With a 15° dwell on the cam and the spindle rotating at 60 r.p.m., the duration of the signal would not exceed 1/24 of a second. Thus, any signal of 1/10 second duration means that the spindle has actualy dropped to a speed so low that it will not make any additional revolutions but will stop within the required 15°. The circuit employed feeds this signal into the relay coil and also into one of a normally open pair of output contacts. If the signal has a shorter duration than one that indicates complete stoppage of the spindle and if a proper delay time for the relay has been chosen, for instance 1/10 second in the example above, the output contacts will not close. Once the signal duration equals or exceeds the delay of the relay, the contacts will close and a signal is passed that indicates that the spindle is both at rest and in position. This circuit thus becomes a filter passing pulse only a certain minimum duration and filtering out all shorter signals.

Once this solution to our problem was decided upon we needed to find a suitable relay. We needed one in which a series of short pulses would not have a cumulative effect. This ruled out thermal delays. It also ruled out those hydraulic or pneumatic devices which might require apreciable time for the de-energizing. These basic requirements were met by time delay relay which is commercially available, namely. Heineman Manufacturing Co., as type No. AN1–522.

In this relay the core is axially slidable and loaded by a piston in an oil filled cylinder. The piston is spring loaded and has a check valve for quick recovery so that there is no cumulative effect at the frequencies under consideration, usually less than 5 cycles per second to zero cycles per second. By choosing the proper size piston, the device may be made responsive to pulses of at least a certain duration for instance 1/20 second.

This application of the relay as a kind of sensing device has wider applications than the one we have illustrated.

Although the device is basically sensitive to pulse duration, it may also measure or filter frequencies where the relation between the pulse duration and the period of the cycle is known, for instance half wave rectification of an alternating voltage. For example, a 5 c.p.s. square wave has a positive half cycle of 1/10 second. By designing the piston size to provide a delay of 1/10 second the device will pass any square wave under 5 c.p.s.

This is an important feature of the invention as it is difficult to obtain accurate measurement or filtering of frequencies of less than 5 c.p.s. and down to zero c.p.s. At zero c.p.s. the device operates as a zero speed indicator.

Referring specifically to the figures, the invention generally comprises a first high speed motor 1 directly belted to drive shaft 3 through pulleys 14, 14a and belt 15, a second low speed motor 2, which is connected to drive the shaft 3 through an overrunning clutch 4, and electrical control means 5 containing relay control circuits for controlling the operation. In a typical coil winding operation the shaft 3 rotatably drives a wire guide 6 which is adapted to feed the wire 7 around a stationary coil form on holder 8. A plurality of coil form holders 9, 10 and 11 may be mounted on a horizontal turret 12 for continuous production. Turret 12 is operated by motor 12′ through time delay T.

More specifically, the motor 2 and shaft 16 are connected to the clutch 4 my means of the gear 17 and belt or chain 18.

The motor 1 is adapted to be energized by means of the switch control 5 to turn the shaft 3. Clutch 4 permits shaft 3 to rotate freely at high speeds even though motor 2 is turning slowly or is stationary. When a predetermined number of turns is accomplished the motor 1 is de-energized by means of the notched plate 20 which is geared to the shaft 3 by means of gears 22, 23, 23a, 24. After the motor 1 has turned a predetermined number of times the cam follower 25 will enter the notch 26 in the plate 20, thereby opening the contacts 27 which de-energize the motor 1 as will be more fully described in connection with the circuit of FIGURE 2.

At the same time the contacts 28 are connected which energizes the positioning motor 2 to turn the shaft 3 at low speed until the cam 30 mounted on the shaft 3 opens the contacts 34 which de-energize the motor 2 thereby stopping the shaft 3 at a predetermined angle of rotation which may be adjusted by varying the angular position of the cam 30′ on the shaft 3. The apparatus is then ready for another cycle.

When using a horizontal turret arrangement the turret 12 would be rotated by motor 12′ in position so that the next coil form 9 would be in position under the guide 6. The turret is preferably automatically rotated without any cutting of the wire. The turret may have many more coil forms than shown and an operator or other apparatus may cut and secure the ends of the wire and insert new coil forms on the holders 8, 9, 10, and 11 without interfering with the continuous coil winding operation which may be made fully automatic if desired. In practice, loading, cutting the connecting wire, and removing the finished coils may also be accomplished automatically. An axial movement of the guide 6 may be desirable in some cases but is outside the scope of the present invention.

Referring to the circuit of FIGURE 2, it is as follows:

The battery 30 is connected from ground through relay coil 31 and push button 5′ back to ground. The battery is also connected through switch 31′ and relay coil 32 to the motor 1. The battery is also adapted to be connected through contacts 27, holding coil 33, switch 32′ to the motor 1.

The operation of this part of the circuit is as follows:

When the push button 5′ is energized a circuit is completed from ground through battery 30, relay coil 31, push button 5′ back to ground. The coil 31 causes the switch 31′ to close completing a circuit from battery 30, switch 31′, relay coil 32 and motor 1. This starts the motor and also closes the switch 32′ so that a running circuit is completed from the battery 30 through the contacts 27, holding coil 33, switch 32′ to the motor 1. When the notched wheel 20 rotates a predetermined amount the cam follower 25 will enter the notch 26 thereby opening the contacts 27 and de-energizing the motor by opening the switch 32′. Subsequent closing of the contacts 27 by overrun of the motor will not energize the motor as the switch 32′ will remain open.

The circuit for the positioning motor 2 is similar to the motor 1 circuit with the contacts 28 being substituted for the push button. In this circuit the battery 30a is connected through coil 31a and contacts 28 to ground. The battery is also connected through contacts 34, holding coil 33a, switch 32b to the motor 2. The battery 30a is also connected through switch 31b and coil 32a to motor 2.

Time delay T′ is connected to contacts 34 and provides a signal to utilization apparatus such as motor 12′ when the shaft 3 is actually stopped.

The operation of the positioning motor 2 circuit is as follows:

When the cam follower 25 enters the notch 26 the contacts 28 will be closed which completes a circuit to start the motor 2 from the battery 30a to relay coil 31a and contacts 28 to ground. This circuit also closes the switch 31b which completes the circuit from the battery 30a through switch 31b and coil 32a to the motor 2. This circuit starts the motor and closes the switch 32b so that the running circuit is completed from the battery 30a through the contacts 34, holding coil 33a, switch 32b to the motor 2. This circuit will be broken when the cam 30 opens the contacts 34 which will de-energize the holding coil and open the switch 32b. The motor 2 is a low speed motor so that it can be stopped at a predetermined angular position.

In the embodiment shown the motor 2 is started at the same time that the motor 1 is de-energized. This condition is not necessary as the motor 2 may be running before the motor 1 is stopped. As long as the speed of motor 1 drives shaft 3 at high speeds the drive from motor 2 is disconnected by the overrunning clutch. When shaft 3 is decelerated by de-energizing motor 1 to the speed of motor 2, the clutch is effective and causes shaft 3 to continue to revolve a portion of a turn at slow speed until contacts 34 are opened.

The two control circuits are insulated by means of the insulation mounting 35 which mounts the movable portions of the contacts 27 and 28. The mounting 35 may be an insulated spring member and is mounted on the insulating block 36 connected to the frame. Time delay T' provides a signal to utilization apparatus when shaft 3 is actually stopped or at a predetermined frequency.

FIGURE 3 shows a typical simplified circuit arrangement. The motor 1 is connected to one side of the power line L$_1$. The other side of power line L$_2$ is connected through the momentary foot switch or push button 5a to the motor. The contacts 27' are in parallel with the push button switch and they are normally closed when the cam follower 25 is not in any one of the notches 19, 21, and 22. The notches are made wide enough so that normal overrun of the motor will not reclose the contacts 27'.

The operation of the circuit thus far is as follows:

The foot switch or push button 5a is pressed closed long enough to have the cam follower ride out of a notch in the disc 20. Thereafter, the motor 1 will continue to operate until the contacts 27 are broken when the cam follower 25 enters the next one of the notches.

At the same time contacts 27' are broken, contacts 28' connect motor 2 to one side L$_2$ of the line and the motor 2 circuit is completed through contacts 34 to the other side of the line L$_1$.

Therefore, when motor 1 is de-energized the motor 2 is started and operates at low speed until the cam 30 opens normally closed contacts 34, at the predetermined angle of rotation. In FIGURE 3, the disc 20 is shown with several notches for programming the winding of a coil. For instance, stops may be made for attaching tap leads to the center of the coil. Time delay T' supplies a zero speed signal to utilization apparatus when the shaft of motor 2 is actually stopped.

FIGURE 4 shows a schematic circuit detail showing the time delay relay T'. When the contacts 34 are opened by the cam 30' the coil 40 of the time delay relay is de-energized. This causes the contacts 41 to open or close depending upon the form of the output desired, for utilization apparatus such as motor means 12', FIGURE 1, after the time delay built into the relay T'. The delay may be provided by having a piston or an air chamber, for instance of the type previously mentioned manufactured by the Heineman Manufacturing Co., as type No. AN1–522.

Therefore, the present invention provides means for rotating a shaft a predetermined number of turns at high speed then positioning the angular position of the shaft at low speed. The invention is not limited to coil winding apparatus but may have application in other fields. The electrical circuits are illustrative only. Practical embodiment of this invention may include braking circuits for both motors, speed controls, timers or other programming means and suitable interaction between circuits to prevent rotation of shaft 3 when turret 12 is improperly positioned, prevent rotation of turret when wire guide 6 is in an interfering location. Operation of the entire mechanism may be sequential and automatic, or may require tripping by a suitable foot switch as a signal by the operator that the turret has been loaded with an empty coil form ready for winding. The particular electrical control features are illustrative only since the electrical control may be performed by various other equivalent electrical control circuits.

The device is also useful as a frequency sensing device for low frequencies down to 0 c.p.s. at which point it operates as a zero indicator.

Many modifications may be made by those who desire to practice the invention without departing from the scope thereof which is defined by the following claims:

I claim:

1. Zero speed sensing means for a motor driven shaft comprising,
   a cam on said shaft,
   electrical contact means riding on said cam whereby said contacts generate pulses proportional in duration to said shaft speed of rotation,
   time delay means connected to said contacts said time delay means being substantially insensitive to pulses generated by said contacts which are shorter than said time delay,
   and utilization means connected to said time delay means whereby when said shaft slows to a predetermined speed said contacts will generate a pulse longer in duration than said time delay means, said time delay means being responsive to said longer pulse to send a signal to said utilization means.

2. Apparatus as in claim 1 wherein said time delay means is substantially insensitive to any cumulative effect caused by a series of shorter pulses.

References Cited

UNITED STATES PATENTS

| | | | |
|---|---|---|---|
| 2,802,978 | 8/1957 | Legros | 318—265 X |
| 2,879,460 | 3/1959 | Crawford et al. | 318—51 X |
| 3,083,325 | 3/1963 | George | 318—102 |

BENJAMIN DOBECK, *Primary Examiner.*

ORIS L. RADER, *Examiner.*

J. C. BERENZWEIG, J. J. BAKER, *Assistant Examiners.*